United States Patent Office 3,819,600
Patented June 25, 1974

3,819,600
α-CARBOXAMIDO ACYL DERIVATIVES OF PENICILLIN
Ernest S. Hamanaka, Groton, Conn., assignor to Pfizer Inc., New York, N.Y.
No Drawing. Filed Jan. 28, 1972, Ser. No. 221,814
Int. Cl. C07d 99/16
U.S. Cl. 260—239.1    12 Claims

ABSTRACT OF THE DISCLOSURE

Penicillins of the formula

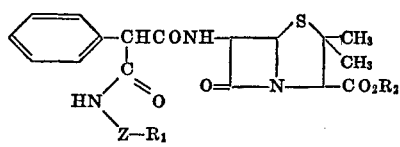

wherein $R_1$ is alkyl or substiuted alkyl wherein said alkyl contains from 1 to 4 carbonatoms and said substituent is carboxy, carbamyl, cyano, chloro, bromo or alkoxy or alkylthio containing 1 to 3 carbon atoms; Z is —O—,

or $SO_2$; $R_2$ is hydrogen or 1-alkanoyloxyalkyl wherein said alkanoyl contains 2 to 5 carbonatoms and said alkyl contains from 1 to 4 carbon atoms; and the pharmaceutically acceptable salts thereof, wherein said pencillin is an acid as broad spectrum antibiotics.

BACKGROUND OF THE INVENTION

This invention relates to a novel series of chemotherapeutic agents, and in particular to a series of α-carboxamidobenzylpenicillins and to esters and salts thereof, possessing high antibacterial activity following oral administration.

The compounds in the group belonging to the family of penicillins differ from one another in the nature of the R variable and possess the general formula indicated below wherein the acyl moiety on the 6-aminopenicillanic acid is derived from a carboxylic acid or functional derivative thereof, such as an acyl halide or anhydride.

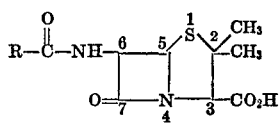

The pharmacodynamic and antibacterial characteristics of a given penicillin are dictated to a great extent by the nature of the R group. The most widely used penicillins are those wherein the R moiety is repesented by benzyl-, phenoxymethyl- and α-phenoxyethyl-. While these well-known congeners are highly effective against gram-positive microorganisms they have little Gram-negative activity. Consequently, drugs which will combat Gram-negative infections, e.g., *E. coli*, are of value to the medical profession.

Recent attempts to improve the profile of activity within the family of penicillins has resulted in the preparation of α-carboxybenzylpenicillin (U.S. Pat. 3,142,673), a broad spectrum antibiotic with greater efficacy against Gram-negative infections via the parenteral route of administration. Disclosed, but not claimed in the same patent, are simple amides of α-carboxybenzylpenicillin. More recently, antibacterial activity has been claimed for a series of α-carboxamidobenzylpenicillins in German Pat. application 2,062,295.

SUMMARY OF THE INVENTION

It has now been found that a series of novel α-carboxamidobenzylpenicillin of the formula

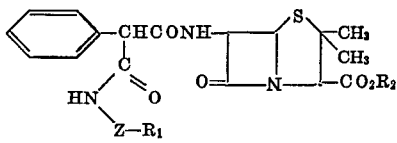

wherein $R_1$ is alkyl or substituted alkyl said alkyl containing from 1 to 4 carbon atoms and said substituent is carboxy, carbamyl, cyano, chloro, bromo or alkoxy or alkylthio each containing from 1 to 3 carbon atoms; Z is —O—,

or —$SO_2$—; $R_2$ is hydrogen or 1-alkanoyloxyalkyl said alkanoyl containing 1 to 4 carbon atoms; and the pharmaceutically acceptable basic salts thereof, wherein said penicillin is an acid, are broad spectrum antibacterial agents.

Useful as intermediates in the preparation of the above described antibacterial agents are compounds of the above formula wherein Z is —O—; $R_1$ is succinimido and $R_2$ is 1-alkanoyloxyalkyl with the previously indicated carbon content limitations.

The preferred antibacterials of the instant invention are those congeners wherein Z is —O—, $R_2$ is 1-alkanoyloxyalkyl wherein said alkanoyl contains 2 to 5 carbon atoms and said alkyl contains 1 to 4 carbon atoms and $R_1$ is carboxymethyl or carbamylmethyl.

A second preferred class of compounds of the instant invention are those wherein Z is

$R_2$ is 1-alkanoyloxyalkyl with the previously indicated carbon content limitations, and $R_1$ is carboxymethyl or methyl.

A third preferred class of antibacterial agents of the present invention are those wherein Z is —$SO_2$—, $R_2$ is 1-alkanoyloxyalkyl with the previously indicated carbon content limitations and $R_1$ is methyl or carboxmethyl.

The preferred class of intermediates of the present invention are those wherein Z is —O—, $R_1$ is succinimido and $R_2$ is 1-alkanoyloxyalkyl wherein said alkanoyl contains 2 to 5 carbon atoms and said alkyl contains 1 to 4 carbon atoms.

DETAILED DESCRIPTION OF THE INVENTION

In accordance with the process employed for synthesizing the penicillins of the instant invention, wherein Z is —O—, $R_1$ is hydrogen, succinimido, alkyl or alkyl substituted by carboxy, carbamyl, cyano, chloro, bromo, alkoxy or alkylthio and $R_2$ is 1-alkanoyloxyalkyl, the following scheme is illustrative:

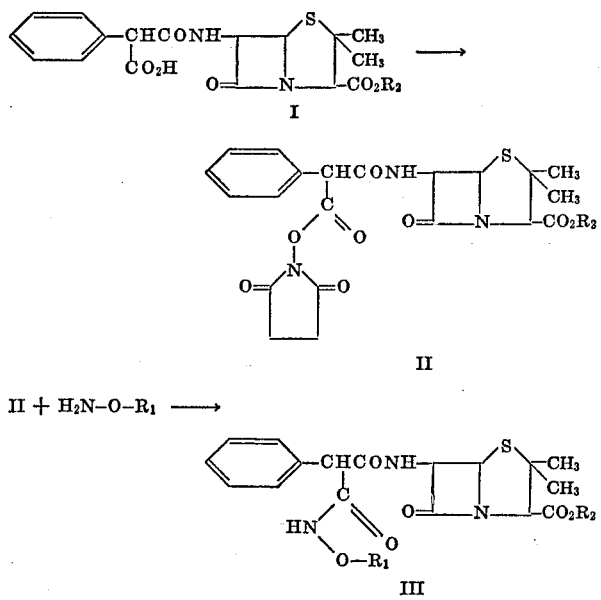

II + $H_2N-O-R_1 \longrightarrow$

In practice, the α-carboxybenzylpenicillin ester, I, is coupled with N-hydroxysuccinimide in the presence of a carbodiimide, such as dicyclohexyl-carbodiimide, to provide the intermediate II. The reaction, which is conveniently carried out in a reaction-inert, aprotic solvent such as tetrahydrofuran at room temperature, comprises contacting approximately equimolar amounts of the succinimide, penicillin and diimide for a period of about 30 minutes to 2 hours. The product, obtained by concentration of the filtered reaction mixture, is dissolved in ethyl acetate, and the organic phase subsequently washed with water, dried and evaporated to dryness. The intermediate can be used without further purification.

The reaction of intermediate II with the appropriate o-substituted hydroxylamine is effected by contacting approximately equimolar amounts of the two reactants in a reaction-inert solvent which is comprised of one or more solvents selected from tetrahydrofuran, dimethylformamide, methylene chloride, ethanol or hexamethylphosphoramide. Said reactions are carried out at 0° to —70° C. with reaction times of 30 minutes to 4 hours. After allowing the reaction mixture to warm to room temperature, it is subsequently diluted with a water immiscible solvent such as ethyl acetate and water, and the resulting organic phase concentrated to provide the desired product, III.

Hydrolysis of the ester function of congeners of structure III to provide the corresponding penicillins wherein $R_2$ is hydrogen is effected using a pH 9 buffer at room temperature in a reaction-inert solvent such as acetone. Following completion of the reaction, the pH is adjusted, using dilute hydrochloric acid, to approximately 5, and the resulting, liberated penicillin extracted into a suitable water immiscible solvent such as methylene chloride or ethyl acetate. Removal of the solvent in vacuo provides the desired compounds.

The starting reagents related to I are conveniently synthesized from the appropriate 6-aminopenicillanic acid (6–APA) ester and an activated form of phenylmalonic acid, generally the mono acid chloride. The appropriate 6–APA esters are prepared by the method of v. Daehne et al., J. Med. Chem. 13, 607 (1970), which comprises alkylation of 6–APA with a suitable 1-alkanoyloxyalkyl halide, the preparation of which are taught by Ulich et. al., J. Am. Chem. Soc., 43, 660 (1921), Euranto et al., Acta. Chem. Scand., 20 1273 (1966) and Rasmussen et al., J. Am. Chem. Soc., 89, 5442 (1967). The mono acid chloride of phenylmalonic acid is prepared according to the procedure as taught in U.S. Pat. 3,282,926.

Preparation of products of the instant invention wherein Z is $$-\overset{O}{\underset{\|}{C}}-$$

or $-SO_2-$, $R_1$ is alkyl or alkyl substituted by carbamyl, cyano, chloro, bromo, alkoxy or alkylthio and $R_2$ is 1-alkanoyloxyalkyl is illustrated as follows:

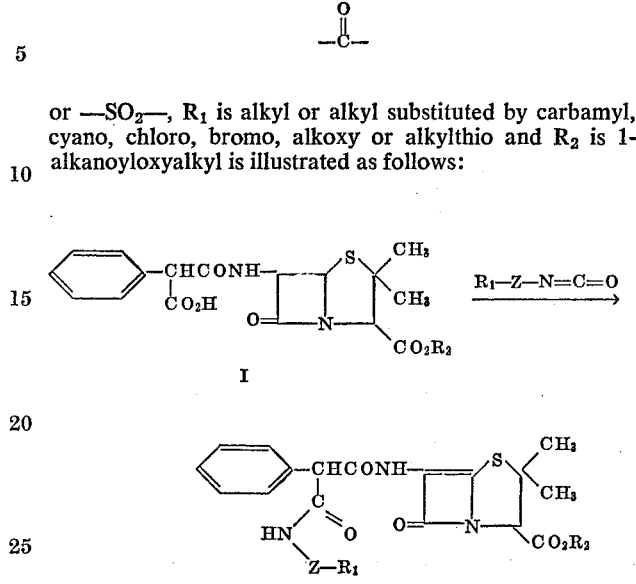

Experimentally, the penicillin ester I is treated with an equimolar amount of the requisite alkanoyl- or alkylsulfonylisocyanate in an aprotic, reaction-inert solvent such as methylene chloride, benzene, tetrahydrofuran or chloroform at room temperature. It is frequently necessary, after allowing the reaction to proceed overnight, to add additional isocyanate to the extent of 100% excess. After the second addition of this starting material the reaction is allowed to stir for an additional eight hours followed by removal of the solvent under reduced pressure. The residual crude product is taken up in a water immiscible solvent such as ether and any residual starting acid removed by successive washes with water, dilute sodium bicarbonate solution, 1 N hydrochloric acid and, finally, dilute sodium chloride solution. The organic phase is subsequently dried over sodium sulfate, and the solvent removed in vacuo to provide the desired product.

Congeners of IV wherein $R_1$ is carboxyalkyl are most conveniently prepared by a reaction of I with a carboxyalkanoyl- or carboxyalkylsulfonylisocyanate wherein said carboxyl moiety is esterified with benzyl alcohol or a lower alkanol. The corresponding acids are obtained by either debenzylation of the benzyl ester employing palladium-on-charcoal and hydrogen or by basic hydrolysis wherein the ester is lower alkyl. The former method is utilized when the maintenance of an ester group at the 3-position of the penicillin molecule is desired. As one skilled in the art is aware, basic hydrolysis, the latter method, also will lead to hydrolysis of the 1-alkanoyloxyalkyl esters at the 3-position, i.e., wherein $R_2$ in said product is hydrogen.

The starting acylisocyanates for the above-described reaction are prepared from acid halides which are commercially available or readily synthesized by methods known in the art via the condensation of said acid halide with silver cyanate according to the method of Hill et al., J. Am. Chem. Soc., 62, 1595 (1940). The requisite sulfonyl isocyanates are similarly formed by the reaction of the appropriate sulfonyl chloride with silver cyanate according to the method as taught by Billeter, Chem. Ber., 38, 2013 (1905) or by the reaction of the requisite sulfonic anhydride with silver cyanate as taught by Field et al., J. Am. Chem. Soc., 76, 1222 (1954). An alternate method for the synthesis of the intermediate sulfonylisocyanates comprises condensation of the sulfonamide with phosgene by the method as taught in German Pat. 817,602.

The starting sulfonic anhydrides are synthesized by the reaction of a sulfonic acid with a diimide following the method of Khorana, Canad. J. Chem. 31, 585 (1953) or with phosphorous pentoxide as taught by Field et al., J. Am. Chem. Soc., 74, 394 (1952) and 76, 1222 (1954). The requisite sulfonic acid and sulfonamides are synthesized by the methods reviewed by Wagner and Zook, "Snythetic Organic Chemistry," John Wiley & Sons, Inc., New York, 1956, pages 811 and 821.

As has been previously noted, a characteristic feature of the acidic penicillins of the present invention is their ability to form basic salts. Said compounds are those wherein $R_2$ is hydrogen, $R_1$ is carboxyalkyl or Z is

or —$SO_2$—. The latter instances of acidity are related to the proton of the imide or sulfonylamide which is acidic by virtue of the electron delocalization effects of the carbonyl or sulfonyl groups. As one skilled in the art can readily appreciate, by controlling the amount of base employed during the preparation of basic salts, which can be either in an aqueous or nonaqueous medium, the formation of mono-, di- or tri-basic salts can result. For example, when $R_2$ is hydrogen, $R_1$ is carboxyalkyl and Z is either

or —$SO_2$— and one equivalent of a base is employed, a mono salt results; if two equivalents are employed, a dibasic salt results; and further, if three equivalents of the base are used, a tribasic salt results. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, secondary amines such as dicyclohexylamine and tertiary amines such as triethylamine, N-methylpyrrolidine, N-methylmorpholine and 1,5-diazabicyclo[4,3,0]-5-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds of the present invention, which form basic salts, it is preferred, of course, to use pharmaceutically acceptable salts. Although water insolubility, high toxicity, or lack of crystalline nature may make some particular salt species unsuitable or less desirable for use as such in a given pharmaceutical application, the water insoluble or toxic salts can be converted to the corresponding pharmaceutically accpetable bases by decomposition of the salt as described above, or alternately they can be converted to any desired pharameceutically acceptable basic salt. The said pharmaceutically acceptable salts preferred include the sodium, aluminum, potassium, calcium, magnesium, ammonium and substituted ammonium, e.g., protaine, dibenzylamine, N,N'-dibenzylethylenediamine, N,N - bis(dihydroabietyl)ethylenediamine, 1 - ephenamine, N - ethylpiperidine, N - benzyl-β-phenethylamine, triethylamine, as well as salts with other amines which have been used to form salts with benzylpenicillin.

The novel penicillins described herein exhibit in vitro activity against a wide variety of microorganisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like, or for sterilization purposes, e.g., sick-room utensils.

These novel penicillins are also effective antibacterial agents in vivo in animals, including man, not only via the parenteral route of administration but also by the oral route of administration.

Obviously, the physician will ultimately determine the dosage which will be most suitable for a particular individual person, and it will vary with the age, weight and response of the particular patient as well as with the nature and extent of the symptoms and the pharmacodynamic characteristics of the particular agent to be administered. It will often be found that when the composition is administered orally, larger quantities of the active ingredient will be required to produce the same level as produced by a small quantity administered parenterally.

Having full regard for the foregoing factors it is considered that an effective daily oral dose of the compounds of the present invention in humans of approximately 10–200 mg./kg. per day, with a preferred range of about 50–150 mg./kg. per day in single or divided doses, and a parenteral dose of 20–100 mg./kg. per day, with a preferred range of about 30–80 mg./kg. will effctively alleviate the symptoms of the infection. These values are illustrative, and there may of course, be individual cases where higher or lower dose ranges are merited.

Many of the penicillin ester compounds of this invention exhibit improved absorption on oral administration over that produced by the corresponding free acid or alkali metal salt forms. They, therefore, represent convenient and effective dosage forms of α-carboxamide derivatives of benzylpenicillin.

Further, many of the esters described herein, although inactive or of relatively low activity against Gramnegative organisms per se are, when administered orally to animals, including man, metabolized to the parent acid, which has a wide spectrum of activity against Grampositive and Gram-negative bacteria. They thus serve as pro-drug forms of the parent compounds since they are biologically converted in vivo to said compounds. The rate of metabolic convertion of such esters to the parent acid occurs at such a rate as to provide an effective and prolonged concentration of the parent acid in the animal body. In effect, such esters act as depot sources for the parent acid.

The preferred α-carboxamidobenzylpenicillins of the instant invention are 6-[2-phenyl - 2 - carboxymethoxyaminocarbonylacetamido]penicillanic acid, pivaloyloxymethyl ester; 6-[2-phenyl - 2 - carbamylmethoxyaminocarbonylacetamido]penicillanic acid, pivaloyloxymethyl ester; 6-[2-phenyl - 2 - carboxyacetylcarbamylacetamido] penicillanic acid, pivaloyloxymethyl esters; 6-[2-phenyl-2 - acetylcarbamylacetamido]penicillanic acid, pivaloyloxymethyl ester; 6-[2-phenyl-2-methylsulfonylcarbamylacetamido]penicillanic acid, pivaloyloxymethyl ester; and 6 - [2 - phenyl - 2 - carboxymethylsulfonylcarbamylacetamido]penicillanic acid, pivaloyloxymethyl ester. The preferred intermediate leading to compounds of the present invention is 6-[2-phenyl-2-(1-succinimidooxycarbonyl)acetamido]penicillanic acid, pivaloyloxymethyl ester.

The antimicrobial spectra of 6-[2-phenyl - 2 - acetylcarbamylacetamido]penicillanic acid, pivaloyloxymethyl ester against several bacteria is presented below in Table I. The tests were run under standardized conditions in which nutrient broth containing various concentrations of the test material was seeded with the particular organism specified, and the minimum concentration (MIC) at which growth of each organism failed to occur was observed and recorded.

TABLE I

In vitro Data of 6-[2-phenyl-2-acetylcarbamylacetamido] penicillanic acid, pivaloyloxymethyl ester (MIC; mcg./ml.)

| Organism: | MIC |
|---|---|
| Staphylococcus aureus 006 | 3.125 |
| Streptococcus pyogenes | 0.024 |
| Pasteurella multocida | 25 |
| Hemophilus influenzae | 0.391 |
| Staphylococcus aureus 005 | 1.562 |
| E. coli | 50 |

Tables II and IIA present in vivo data for 6-[2-phenyl-2 - acetylcarbamylacetamido]penicillanic acid, pivaloyloxymethyl ester and 6-[2-phenyl - 2 - carboxymethoxyaminocarbonylacetamido]penicillanic acid, pivaloyloxymethyl ester, respectively, against several experimental infections in mice.

The values (survivors/total number of infected mice) are obtained under standard conditions known to those skilled in the art. The test compound is administered to the infected mice by a multiple dosing regimen in which the first dose is given 0.5 hour after inoculation and is repeated four and twenty-four hours later.

TABLE II

In vivo data for 6-[2-phenyl-2-acetylcarbamylacetamido]penicillanic acid, pivaloyloxymethyl ester vs. several bacterial infections in mice*

| | E. coli 266 | | Staph. aureus 005 | |
|---|---|---|---|---|
| | PO | SQ | PO | SQ |
| Dose (mg./kg.): | | | | |
| 200 | 6/10 | 5/10 | 3/10 | 7/10 |
| 50 | 4/10 | 4/10 | 2/10 | 2/10 |

*PO-oral; SQ-subcutaneous route of administration. Ratio of survivors/total mice.

TABLE IIA

In vivo data for 6-[2-phenyl-2-carboxymethoxyaminocarbonylacetamido]-penicillanic acid, pivaloyloxymethyl ester vs. bacterial infections in mice*

| | E. coli 266 | | Staph. aureus 005 | |
|---|---|---|---|---|
| | PO | SQ | PO | SQ |
| Dose (mg./kg.): | | | | |
| 200 | 2/10 | 5/10 | 7/10 | 7/10 |
| 50 | 2/10 | 4/10 | 0/10 | 3/10 |

*See footnote at end of Table II.

The novel products of this invention are of value as antibacterial agents and are remarkably effective in treating a number of infections caused by susceptible Gram-negative and Gram-positive bacteria in poultry and animals including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or nonaqueous such as fatty oils of vegetable origin (cotton seed, peanut oil, corn sesame) and other nonaqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The following examples are provided solely for the purpose of illustration and are not to be construed as limitations of this invention, many variations of which are possible without departing from the spirit or scope thereof.

EXAMPLE 1

6-[2-Phenyl-2-carboxyacetamido]penicillanic acid, 3-pivaloyloxymethyl ester, N-hydrosuccinimide ester To a solution of 14 g. (28.5 mmoles) of 6-[2-phenyl-2-carboxyacetamido]penicillanic acid, 3-pivaloyloxymethyl ester in 300 ml. of dry tetrahydrofuran under an atmosphere of nitrogen at room temperature is added 3.28 g. (28.5 mmoles) of N-hydroxysuccinimide. After three minutes of stirring, 5.87 g. (28.5 mmoles) of dicyclohexylcarbodiimide is added, and the resulting mixture allowed to stir for an additional two hours at room temperature. The precipitate, which commences to form three minutes after the addition of the carbodiimide is complete, is filtered, and the filtrate concentrated in vacuo. The residual white gum is dissolved in ethyl acetate, and the resulting solution washed with water, a sodium chloride solution and, finally, dried over sodium sulfate. The solvent is removed under reduced pressure, and the crude product triturated with isopropyl ether, 13.3 g. (79% yield).

EXAMPLE 2

Starting with the 6-[2-phenyl-2-carboxyacetamido] penicillanic acid, 3-(1-alkanoyloxyalkyl)ester, and repeating the procedure of Example 1, the following congeners are prepared:

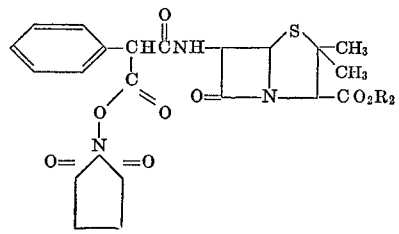

| $R_2$ | $R_2$ |
|---|---|
| $CH_3CO_2CH_2-$ | $CH_3(CH_2)_2CO_2CH(C_2H_5)-$ |
| $CH_3CO_2CH(CH_3)-$ | $CH_3(CH_2)_3CO_2CH_2-$ |
| $CH_3CO_2CH(C_2H_5)-$ | $CH_3(CH_2)_3CO_2CH(C_3H_7)-$ |
| $C_2H_5CO_2CH_2-$ | $(CH_3)_3CCO_2CH(CH_3)-$ |
| $C_2H_5CO_2CH(CH_3)-$ | $(CH_3)_3CCO_2CH(C_2H_5)-$ |
| $C_2H_5CO_2CH(C_3H_7)-$ | $CH_3CO_2CH(C_3H_7)-$ |
| $(CH_3)_2CHCO_2CH_2-$ | $CH_3CH(CH_3)CO_2CH_2-$ |
| $(CH_3)_2CHCO_2CH(CH_3)-$ | $(CH_3)_2CHCO_2CH(CH_3)-$ |
| $CH_3(CH_2)_2CO_2CH_2-$ | $(CH_3)_2CHCH_2CO_2CH_2-$ |

EXAMPLE 3

6-[2-Phenyl-2-carboxymethoxyaminocarbonylacetamido] penicillanic acid, 3-pivaloyloxymethyl ester, sodium salt To a solution of aminooxyacetic acid, formed by treatment of 109 mg. (1 mmole) of aminooxyacetic acid hemihydrochloride with 0.21 ml. (1.5 mmoles) of triethylamine, in 3 ml. of methylene chloride and cooled to —70° C. is added 589 mg. (1 mmole) of 6-[2-phenyl-2-carboxyacetamido]penicillanic acid, 3 - pivaloyloxymethyl ester, N-hydroxysuccinimide ester dissolved in 3 ml. of the same solvent. The reaction mixture is allowed to warm to room temperature over a period of one hour where it is maintained with stirring for two hours. The solvent is removed in vacuo and the residue partitioned between ethyl acetate and water at pH 1.5. The water is separated, treated with fresh ethyl acetate and the pH of the aqueous layer adjusted to 7 with a sodium bicarbonate solution. Sodium chloride is added and the organic phase subsequently separated, dried over sodium sulfate and concentrated to dryness under reduced pressure. The product consists of the sodium salt as a white powder, 445 mg. (78% yield).

EXAMPLE 4

6-[2-Phenyl-2-carbamylmethoxyaminocarbonylacetamido]penicillanic acid, pivaloyloxymethyl ester In a preparation similar to that of Example 3, 5.89 g. (10 mmoles) of 6-[2-phenyl-2-carboxyacetamido]penicillanic acid, 3-pivaloyloxymethyl ester, N-hydroxysuccinimide ester in 25 ml. of methylene chloride is added dropwise to a solution of 900 mg. (10 mmoles) of aminooxyacetamide in 30 ml. of methylene chloride which has been previously cooled to −70° C. After the addition is complete, the cooling bath is removed and the reaction allowed to stir for four hours. The solvent is removed under reduced pressure, and the residue partitioned between ethyl acetate and an aqueous acid solution of pH 2. The organic phase is separated, washed successively with water and a brine solution and, finally, dried over sodium sulfate. Removal of the ethyl acetate *in vacuo* provides the desired product as an amorphous solid.

EXAMPLE 5

Employing the indicated procedure and starting with the appropriate hydroxylamine derivative and requisite penicillin ester, the following compounds are synthesized:

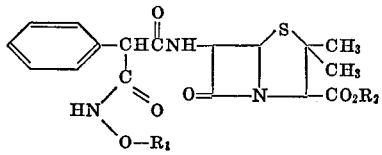

| $R_1$ | $R_2$ | Procedure |
|---|---|---|
| $CH_3$— | $CH_3CO_2CH_2$— | Example 4. |
| $C_2H_5$— | $C_2H_5CO_2CH_2$— | Do. |
| $n\text{-}C_4H_9$— | $(CH_3)_2CHCO_2CH(CH_3)$— | Do. |
| $t\text{-}C_3H_7$— | $(CH_3)_3CCO_2CH_2$— | Do. |
| $HO_2CCH_2$— | $(CH_3)_2CHCO_2CH_2$— | Example 3. |
| $HO_2CCH(CH_3)$— | $CH_3CO_2CH(CH_3)$— | Do. |
| $HO_2C(CH_2)_2$— | $CH_3(CH_2)_2CO_2CH_2$— | Do. |
| $HO_2CC(CH_3)_2$— | $CH_3CO_2CH(C_2H_5)$— | Do. |
| $HO_2C(CH_2)_4$— | $(CH_3)_2CHCH_2CO_2CH_2$— | Do. |
| $H_2NCOCH_2$— | $CH_3CO_2CH_2$— | Example 4. |
| $H_2NCOCH_2$— | $CH_3CO_2CH(C_2H_5)$— | Do. |
| $H_2NCOCH(CH_3)$— | $(CH_3)_3CCO_2CH_2$— | Do. |
| $H_2NCO(CH_2)_2$— | $(CH_3)_3CCO_2CH(CH_3)$— | Do. |
| $H_2NCOC(CH_3)_2$— | $CH_3CH(CH_3)CO_2CH_2$— | Do. |
| $H_2NCO(CH_2)_4$— | $CH_3CO_2CH_2$— | Do. |
| $NC(CH_2)_2$— | $CH_3CO_2CH_2$— | Do. |
| $NC(CH_2)_2$— | $(CH_3)_3CCO_2CH_2$— | Do. |
| $NC(CH_2)_3$— | $(CH_3)_2CHCO_2CH(CH_3)$— | Do. |
| $NCCH(CH_3)CH_2$— | $CH_3(CH_2)_2CO_2CH(C_2H_5)$— | Do. |
| $NCCH_2CH(CH_3)$— | $(CH_3)_2CHCH_2CO_2CH_2$— | Do. |

EXAMPLE 6

The procedure of Example 4 is again repeated, starting with the appropriate o-substituted hydroxyamine derivative and 6-[2-phenyl - 2 - carboxyacetamido]penicillanic acid, 3-(1-alkanoyloxyalkyl)ester, N-hydroxysuccinimide ester, to provide the following analogs:

6-[2-phenyl-2-(2-chloroethoxyaminocarbonyl)acetamido]penicillanic acid, 3-acetoxymethyl ester;
6-[2-phenyl-2-(2-chloropropoxyaminocarbonyl)acetamido]penicillanic acid, 3-(1-propionyloxyethyl)ester;
6-[2-phenyl-2-(3-chloropropoxyaminocarbonyl)acetamido]penicillanic acid, 3-isobutyryloxymethyl ester;
6-[2-phenyl-2-(3-chlorobutoxyaminocarbonyl)acetamido] penicillanic acid, 3-pivaloyloxymethyl ester;
6-[2-phenyl-2-(2-bromoethoxyaminocarbonyl)acetamido] penicillanic acid, 3-(1-acetoxyethyl)ester;
6-[2-phenyl-2-(2-bromopropoxyaminocarbonyl)acetamido]penicillanic acid, 3-(1-propionyloxyethyl)ester;
6-[2-phenyl-2-(2-bromobutoxyaminocarbonyl)acetamido] penicillanic acid, 3-(1-butyryloxybutyl)ester;
6-[2-phenyl-2-(2-methoxyethoxyaminocarbonyl)acetamido]penicillanic acid, 3-acetoxymethyl ester;
6-[2-phenyl-2-(2-ethoxyethoxyaminocarbonyl)acetamido] penicillanic acid, 3-(1-pivaloyloxyethyl)ester;
6-[2-phenyl-2-(3-isopropoxybutoxyaminocarbonyl)acetamido]penicillanic acid, 3-(1-propionyloxyethyl)ester;
6-[2-phenyl-2-(2-methylthioethoxyaminocarbonyl)acetamido]penicillanic acid, 3-(1-isobutyryloxyethyl)ester;
6-[2-phenyl-2-(3-ethylthiopropoxyaminocarbonyl)acetamido]penicillanic acid, 3-butyryloxymethyl ester;
6-[2-phenyl-2-(2-isopropylthiopropoxyaminocarbonyl) acetamido]penicillanic acid, 3-pivaloyloxymethyl ester;
6-[2-phenyl-2-(2-butylthioethoxyaminocarbonyl)acetamido]penicillanic acid, 3-(1-acetoxybutyl)ester.

EXAMPLE 7

6-[2-Phenyl-2-methoxyaminocarbonylacetamido] penicillanic acid, sodium salt

A solution of 4.29 g. (8.15 mmoles) of 6-[2-phenyl-2-methoxyaminocarbonylacetamido]penicillanic acid, 3-acetoxymethyl ester in 83 ml. of acetone at room temperature is treated with 141 ml. of a pH 9.0 borate buffer, and the resulting solution allowed to stir for 5 hours. The acetone is removed under reduced pressure, and the remaining aqueous solution is extracted several times with ethyl acetate. The aqueous phase is rendered acid to pH 2 with 1 N hydrochloric acid, and extracted several times with fresh ethyl acetate. The organic phase is separated, dried over sodium sulfate and concentrated to a yellow gum which on trituration with chloride provides the crude acid product as a yellow powder.

The residual product is dissolved in acetone, treated with one equivalent of triethylamine, and subsequently with sufficient sodium hexanoate dissolved in acetone to precipitate the desired product as the sodium salt.

Following the above general hydrolysis procedure, the following penicillanic acid congeners are synthesized:

6-[2-phenyl-2-n-butoxyaminocarbonylacetamido] penicillanic acid;
6-[2-phenyl-2-carboxymethoxyaminocarbonylacetamido] penicillanic acid;
6-[2-phenyl-2-(4-carboxybutoxyaminocarbonyl) acetamido]penicillanic acid;
6-[2-phenyl-carbamylmethoxyaminocarbonylacetamido] penicillanic acid;
6-[2-phenyl-2-(1-carbamylethoxyaminocarbonyl) acetamido]penicillanic acid;
6-[2-phenyl-2-(2-cyanoethoxyaminocarbonyl) acetamido]penicillanic acid;
6-[2-phenyl-2-(2-cyanopropoxyaminocarbonyl) acetamido]penicillanic acid;
6-[2-phenyl-2-(2-chloroethoxyaminocarbonyl) acetamido]penicillanic acid;
6-[2-phenyl-2-(2-chloropropoxyaminocarbonyl) acetamido]penicillanic acid;
6-[2-phenyl-2-(2-bromoethoxyaminocarbonyl) acetamido]penicillanic acid;
6-[2-phenyl-2-(2-methoxyethoxyaminocarbonyl) acetamido]penicillanic acid;
6-[2-phenyl-2-(3-isopropoxybutoxyaminocarbonyl) acetamido]penicillanic acid;
6-[2-phenyl-2-(3-ethylthiopropoxyaminocarbonyl) acetamido]penicillanic acid; and
6-[2-phenyl-2-(2-butylthioethoxyaminocarbonyl) acetamido]penicillanic acid.

EXAMPLE 8

6-[2-Phenyl-2-acetylcarbamylacetamido]penicillanic acid

To 1.1 g. (2.2 mmoles) of 6-[2-phenyl-2-carboxyacetamido]penicillanic acid, 3-pivaloyloxymethyl ester in 7 ml. of methylene chloride under an atmosphere of nitrogen gas at room temperature is added 3 ml. of acetyl isocyanate, and the resulting reaction mixture allowed to stir overnight at room temperature. The solvent and excess reagent is removed in vacuo, and the residual product is extracted into ethyl ether and subsequently washed successively with water, a sodium bicarbonate solution, a 1 N hydrochloric acid solution and, finally, a saturated brine solution. The ether layer is separated, dried over sodium sulfate and concentrated under reduced pressure to provide the desired product as a yellow powder, 360 mg. (33.6% yield).

EXAMPLE 9

Employing the procedure of Example 8, and starting with the appropriate isocyanate and 6-[2-phenyl-2-carboxyacetamido]penicillanic acid, 3-(1-alkanoyloxyalkyl) ester, the following compounds are prepared:

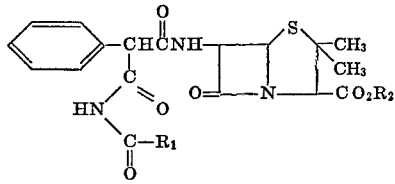

| $R_2$ | $R_1$ |
|---|---|
| $C_2H_5$— | $CH_3CO_2CH_2$— |
| $C_2H_5$— | $(CH_3)_3CCO_2CH_2$— |
| $n$—$C_2H_7$— | $CH_3CH(CH_3)CO_2CH(CH_3)$— |
| $i$-$C_3H_7$— | $CH_3CO_2CH(CH_3)$— |
| $n$—$C_4H_9$ | $C_2H_5CO_2CH_2$— |
| $n$—$C_4H_9$ | $CH_3CO_2CH(C_2H_5)$— |
| $(CH_3)_2CHCH_2$— | $(CH_3)_2CHCO_2CH(CH_3)$— |
| $ClCH_2$— | $CH_3CO_2CH_2$— |
| $Cl(CH_2)_2$— | $CH_3CO_2CH_2$— |
| $Cl(CH_2)_2$— | $CH_3(CH_2)_2CO_2CH_2$— |
| $ClCH(CH_3)$— | $(CH_3)_3CCO_2CH(CH_3)$— |
| $Cl(CH_2)_4$— | $C_2H_5CO_2CH_2$— |
| $BrCH_2$— | $CH_3CO_2CH(C_3H_7)$— |
| $BrCH(CH_3)$— | $(CH_3)_2CHCH_2CO_2CH_2$— |
| $BrCH(CH_3)CH_2$— | $(CH_3)_2CHCH_2CO_2CH_2$— |
| $Br(CH_2)_4$— | $CH_3CH(CH_3)CO_2CH_2$— |
| $CH_3OCH_2$— | $CH_3CO_2CH_2$— |
| $i$-$C_3H_7OCH(CH_3)$— | $(CH_3)_3CCO_2CH_2$— |
| $n$-$C_4H_9O(CH_2)_4$— | $CH_3CH_2CO_2CH_2$— |
| $C_2H_5SCH(CH_3)$— | $(CH_3)_3CCO_2CH_2$— |
| $i$-$C_3H_7SCH_2$— | $(CH_3)_3CCO_2CH_2$— |
| $n$-$C_3H_7SCH_2$— | $CH_3CO_2CH(CH_3)$— |
| $s$-$C_4H_9S(CH_2)_4$— | $CH_3(CH_2)_2CO_2CH(C_3H_7)$— |
| $NCCH_2$— | $CH_3CO_2CH_2$— |
| $NC(CH_2)_2$— | $(CH_3)_2CHCO_2CH(CH_3)$— |
| $NCCH(CH_3)$— | $C_2H_5CO_2CH(CH_3)$— |
| $NC(CH_2)_4$— | $CH_3CH(CH_3)CO_2CH_2$— |
| $H_2NCOCH_2$— | $(CH_3)_3CCO_2CH_2$— |
| $H_2NCO(CH_2)_2$— | $CH_3CO_2CH_2$— |
| $H_2NCOCH_2CH(CH_3)CH_2$— | $CH_3CO_2CH(C_2H_5)$— |

EXAMPLE 10

6-[2-Phenyl-2-carboxyacetylcarbamylacetamido] penicillanic acid, 3-pivaloyloxymethyl ester (a) 6 - [2-Phenyl-2-benzyloxycarbonylacetylcarbamylacetamido]penicillanic acid, 3-pivaloyloxymethyl ester: A solution of 9.8 g. (0.02 mole) of 6-[2-phenyl-2-carboxyacetamido]penicillanic acid, 3-pivaloyloxymethyl ester in 60 ml. of dry methylene chloride is maintained under a nitrogen atmosphere at room temperature while 8.0 g. (0.036 mole) of benzyloxycarbonylacetyl isocyanate is added rapidly. The reaction mixture is allowed to stir overnight at room temperature, followed by removal of the solvent and excess reagent under reduced pressure. The residual crude product is dissolved in ethyl ether, which is, in turn, washed successively with water, a dilute sodium bicarbonate solution, a 1 N hydrochloric acid solution and, then, a brine solution. The ether layer is separated, dried over sodium sulfate and concentrated to dryness in vacuo. The residual intermediate is employed in the next reaction without further purification.

(b) 6 - [2-Phenyl-2-carboxyacetylcarbamylacetamido] penicillanic acid, 3-pivaloyloxymethyl ester: A mixture of 2.0 g. (3 mmoles) of 6-[2-phenyl-2-benzyloxycarbonylacetylcarbamylacetamido]penicillanic acid, 3-pivaloyloxymethyl ester and 200 mg. of 5% palladium-on-charcoal in 25 ml. of tetrahydrofuran is shaken in an atmosphere of hydrogen at atmospheric pressure. When the theoretical amount of hydrogen has been used, the spent catalyst is filtered and the filtrate concentrated in vacuo to dryness. The residue is partitioned between ethyl ether and a cold 1 N sodium hydroxide solution, and the aqueous layer separated and treated with fresh ethyl ether. The pH of the aqueous layer is then gradually adjusted to 5 using 1 N hydrochloric acid, while care is taken that the temperature of the aqueous layer does not rise about 10° C. The organic phase is separated, dried over sodium sulfate and the solvent removed under reduced pressure. The amorphous solid is triturated with isopropyl ether and filtered to provide the desired product as a yellow powder.

Employing the above procedures, and starting with the requisite penicillanic acid esters and isocyanates, the following penicillins are produced:

6-[2-phenyl-2-carboxyacetylcarbamylacetamido] penicillanic acid,
3-acetoxymethyl ester;
6-[2-phenyl-2-(2-carboxypropionylcarbamyl)acetamido] penicillanic acid,
3-(1-acetoxybutyl)ester;
6-[2-phenyl-2-(3-carboxypropionylcarbamyl) acetamido]penicillanic acid,
3-(1-isobutyryloxyethyl)ester;
6-[2-phenyl-2-(4-carboxybutyrylcarbamyl)acetamido] penicillanic acid,
3-(1-propionyloxyethyl)ester;
6-[2-phenyl-2-(3-carboxybutyrylcarbamyl)acetamido] penicillanic acid,
3-(1-pivaloyloxypropyl)ester and
6-[2-phenyl-2-carboxyacetylcarbamylacetamido] penicillanic acid,
3-(1-butyryloxypropyl)ester.

EXAMPLE 11

The hydrolysis procedure of Example 7 is again employed, starting with the appropriate penicillanic acid, 3-ester, to provide the following compounds:

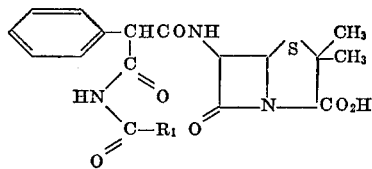

| $R_1$ | $R_1$ |
|---|---|
| $C_2H_5$— | $i$-$C_3H_7SCH_2$— |
| $n$-$C_3H_7$— | $s$-$C_4H_9S(CH_2)_4$— |
| $(CH_3)_2CHCH_2$— | $NCCH_2$— |
| $ClCH_2$— | $NCCH(CH_3)$— |
| $Cl(CH_2)_4$— | $n$-$C_4H_9O(CH_2)_4$— |
| $CH_3OCH_2$— | $H_2NCOCH_2$— |
| $i$-$C_3H_7OCH(CH_3)$— | $H_2NCO(CH_2)_2$— |

EXAMPLE 12

6-[2-Phenyl-2-methylsulfonylcarbamylacetamido] penicillanic acid, 3-pivaloyloxymethyl ester 6-[2 - Phenyl-2-carboxyacetamido]penicillanic acid, 3-pivaloyloxymethyl ester (492 mg.; 1 mmole) is added to a solution of 121 mg. (1 mmole) of methylsulfonyl isocyanate dissolved in 5 ml. of dry methylene chloride and maintained under a nitrogen atmosphere. The resulting solution is allowed to stir at room temperature overnight, after which the solvent is removed *in vacuo* and the residue dissolved in ethyl acetate. The ethyl acetate containing the desired product is placed in separatory funnel, and is washed with water and a saturated brine solution. The organic phase is separated, dried over sodium sulfate and concentrated to dryness under reduced pressure. The final product is isolated as an off-white powder.

EXAMPLE 13

Employing the procedure of Example 12 with analogous results, the following starting reagents are combined to form the desired 6-[2-phenyl-2-sulfonylcarbamylacetamido]penicillanic acid, 3-(1-alkoxyalkyl)esters:

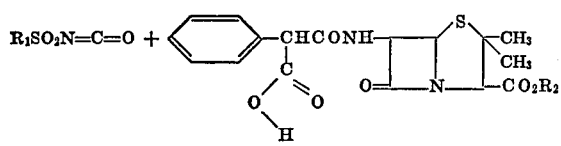

| $R_2$ | $R_1$ |
|---|---|
| $CH_3-$ | $CH_3CO_2CH_2-$ |
| $n-C_3H_7-$ | $CH_3CO_2CH_2-$ |
| $n-C_3H_7-$ | $(CH_3)_3CCO_2CH_2-$ |
| $n-C_4H_9-$ | $C_2H_5COCH(CH_3)-$ |
| $Cl(CH_2)_2-$ | $(CH_3)_2CHCO_2CH_2-$ |
| $Cl(CH_2)_2-$ | $(CH_3)_2CHCH_2CO_2CH_2-$ |
| $Cl(CH_2)_4-$ | $CH_3CO_2CH(C_2H_5)-$ |
| $Br(CH_2)_2-$ | $CH_3CO_2CH(C_2H_5)-$ |
| $Br(CH_2)_4-$ | $(CH_3)_2CHCO_2CH_2-$ |
| $Br(CH_2)_4-$ | $(CH_3)_2CHCH_2CO_2CH_2-$ |

| $R_1$ | $R_2$ |
|---|---|
| $C_2H_5OCH_2-$ | $CH_3CH(CH_3)CO_2CH_2-$ |
| $n-C_3H_7OCH(CH_3)-$ | $(CH_3)_3CCO_2CH(C_2H_5)-$ |
| $i-C_3H_7O(CH_2)_3-$ | $CH_3(CH_2)_3CO_2CH(C_3H_7)-$ |
| $CH_3SCH_2-$ | $CH_3(CH_2)_3CO_2CH(C_3H_7)-$ |
| $n-C_3H_7SCH(CH_3)-$ | $(CH_3)_3CCO_2CH_2-$ |
| $n-C_4H_9SCH_2-$ | $CH_3CO_2CH(C_2H_5)-$ |
| $s-C_4H_9S(CH_2)_4-$ | $CH_3CO_2CH_2-$ |
| $NCCH_2-$ | $CH_3(CH_2)_3CO_2CH_2-$ |
| $NC(CH_2)_3-$ | $C_2H_5CO_2CH(CH_3)-$ |
| $NC(CH_2)_4-$ | $CH_3CO_2CH(C_3H_7)-$ |
| $H_2NCOCH_2-$ | $CH_3CO_2CH(C_3H_7)-$ |
| $H_2NCOCH(CH_3)-$ | $CH_3CO_2CH_2-$ |
| $H_2NCO(CH_2)_3-$ | $CH_3CO_2CH_2-$ |

EXAMPLE 14

6-[2-Phenyl-2-carboxymethylsulfonylcarbamylacetamido] penicillanic acid, 3-pivaloyloxymethyl ester (a) 6-[2 - Phenyl-2-benzyloxycarbonylmethylsulfonylcarbamylacetamido]penicillanic acid, 3-pivaloyloxymethyl ester: Starting with 4.92 g. (0.1 mole) of 6-[2-phenyl-2-carboxyacetamido]penicillanic acid, 3-pivaloyloxymethyl ester and 2.55 g. (0.01 mole) of benzyloxycarbonylmethylsulfonyl isocyanate in 60 ml. of methylene chloride, and repeating the procedure of Example 12, the desired product is obtained in moderate yield as a white powder.

(b) 6-[2 - Phenyl-2-carboxymethylsulfonylcarbamylacetamido]penicillanic acid, 3-pivaloyloxymethyl ester: A suspension resulting from the addition of 250 mg. of 5% palladium-on-charcoal to a solution of 703 mg. (1 mmole) of 6-[2-phenyl-2-benzyloxycarbonylmethylsulfonylcarbamylacetamido]penicillanic acid, 3-pivaloyloxymethyl ester in 15 ml. of tetrahydrofuran is shaken in a hydrogen atmosphere at an initial pressure of one atmosphere. The reaction mixture is worked up by the procedure of Example 10-b to provide the desired product in moderate yield.

Using the above mentioned condensation and hydrogenolysis reactions and starting with the requisite reagents, the following penicillanic acid esters are formed:

6-[2-phenyl-2-(3-carboxypropylsulfonylcarbamyl) acetamido]penicillanic acid, 3-acetoxymethyl ester;

6-[2-phenyl-2-(2-carboxypropylsulfonylcarbamyl) acetamido]penicillanic acid, 3-pivaloyloxymethyl ester;

6-[2-phenyl-2-(4-carboxybutylsulfonylcarbamyl) acetamido]penicillanic acid, 3-(1-acetoxyethyl)ester;

6-[2-phenyl-2-(2-carboxybutylsulfonylcarbamyl) acetamido]-penicillanic acid, 3-(1-isobutyryloxyethyl)ester; and 6-[2-phenyl-2-(2-methyl-3-carboxypropylsulfonylcarbamyl)acetamido]penicillanic acid, 3-acetoxymethyl ester.

EXAMPLE 15

The procedure of Example 7 is repeated, starting with the appropriate ester, to provide the following compounds:

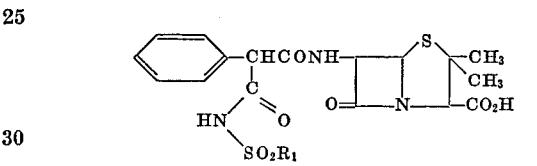

| $R_1$ | $R_1$ |
|---|---|
| $CH_3-$ | $C_2H_5OCH_2-$ |
| $n-C_3H_7-$ | $n-C_3H_7OCH(CH_3)-$ |
| $n-C_4H_9-$ | $i-C_3H_7O(CH_2)_3-$ |
| $Cl(CH_2)_2-$ | $CH_3SCH_2-$ |
| $Br(CH_2)_2-$ | $s-C_4H_9S(CH_2)_4-$ |
| $NC(CH_2)_3-$ | $H_2NCOCH(CH_3)-$ |
| $NCCH_2-$ | $H_2NCO(CH_2)_3-$ |
| $H_2COCH_2-$ | |

EXAMPLE 16

A tablet base is prepared by blending the following ingredients in the proportion by weight indicated.

| | |
|---|---|
| Sucrose, U.S.P. | 80.0 |
| Tapioca Starch | 12.5 |
| Magnesium stearate | 7.5 |

Sufficient 6-[2-phenyl - 2 - carboxymethoxyaminocarbonylacetamido]penicillanic acid, pivaloyloxymethyl ester sodium salt is blended into the base to provide tablets containing 25, 100 and 250 mg. of active ingredient.

EXAMPLE 17

A suspension of 6-[2-phenyl-2-carboxyacetylcarbamylacetamido]penicillanic acid sodium salt is prepared with the following composition:

| | | |
|---|---|---|
| Penicillin compound | g-- | 31.42 |
| 70% Aqueous Sorbitol | g-- | 714.29 |
| Glycerine, U.S.P. | g-- | 185.35 |
| Gum acacia (10% solution) | ml-- | 100.00 |
| Polyvinyl pyrrolidone | g-- | 0.50 |
| Propyl parahydroxybenzoate | g-- | 0.072 |
| Distilled water to make one liter | g-- | 0.094 |

Various sweetening and flavoring agents may be added to this suspension, as well as acceptable coloring. The suspension contains approximately 25 mg. of penicillin compound per milliliter.

EXAMPLE 18

Capsules containing 25, 100 and 250 mg. of active ingredient are prepared by blending sufficient 6-[2-phenyl-2 - carboxymethylsulfonylcarbamylacetamido]penicillanic acid, pivaloyloxymethyl ester potassium salt in the following mixture (proportions given in parts by weight):

| | |
|---|---|
| Calcium carbonate, U.S.P. | 17.5 |
| Dicalcium phosphate | 18.9 |
| Magnesium trisilicate | 4.2 |
| Lactose, U.S. P. | 6.2 |
| Potato starch | 5.2 |
| Magnesium stearate | 1.0 |

EXAMPLE 19

A parenteral form of 6-[2-phenyl-2-methylsulfonylcarbamylacetamido]penicillanic acid, pivaloyloxymethyl ester sodium salt is prepared by dissolving an intimate mixture of the penicillin compound and sodium citrate (4% by weight) in sufficient polyethylene glycol 200 such that the final concentration of the penicillin compound is 25 mg. of active ingredient per milliliter. The resulting solution is sterilized by filtration and sterilely stoppered in vials.

EXAMPLE 20

6-[2-Phenyl-2-carboxymethoxyaminocarbonylacetamido] penicillanic acid, Dipotassium salt To a solution of potassium hydroxide (1.12 g.; 0.02 mole) in 40 ml. of water and 20 ml. of methanol is added, portionwise, 6-[2-phenyl-2-carboxymethoxyaminocarbonylacetamido]penicillanic acid (4.66 g.; 0.01 mole) and the mixture is allowed to stir at room temperature until almost all the solid has dissolved. The hazy solution is filtered and the filtrate concentrated to a small volume and subsequently treated with diethyl ether. The resulting potassium salt is filtered and dried in vacuo.

EXAMPLE 21

6-[2-Phenyl-2-acetylcarbamylacetamido]penicillanic acid, Disodium Salt

A methanol solution of 6-[2-phenyl-2-acetylcarbamylacetamido]penicillanic acid (435 mg.; 1 mmole) is treated with 80 mg. (2 mmoles) of sodium hydroxide to convert the free acid to the disodium salt. The resulting solution is freeze dried and the residue triturated with diethyl ether and filtered.

PREPARATION A

6-[2-Phenyl-2-carboxyacetamido]penicillanic acid, 3-(1-alkanoyloxyalkyl)Esters (a) 6 - Aminopenicillanic acid, pivaloyloxymethyl ester: To a stirred suspension of 10.8 g. (0.05 mole) of 6-aminopenicillanic acid in 50 ml. of dry dimethylformamide at room temperature and under a nitrogen atmosphere is added 9.8 ml. (0.07 mole) of triethylamine, followed after 30 minutes of stirring, by 14.8 ml. (0.1 mole) of chloromethyl pivalate. Stirring is continued for an additional 4 hours, followed by the addition of 150 ml. of ethyl acetate and filtration of the triethylamine hydrochloride. The organic phase is washed (4×50 ml.) with water, dried over sodium sulfate and treated with 90 ml. of 0.5 M solution of p-toluenesulfonic acid in ethyl acetate. The resulting salt is filtered and dried at 45° C. under vacuum, 9.2 g., m.p. 150° C. dec.

The free base is generated, as needed, by treatment of the above salt in a mixture of 1:1 ethyl acetate-water with sufficient saturated sodium carbonate solution to provide a pH 8.0, followed by separation of the organic layer, drying and concentration under reduced pressure to an oily residue.

(b) 6-[2-Phenyl-2-carboxyacetamido]penicillanic acid, 3-monopivaloyloxymethyl ester sodium salt (I; $R_1$=H, $R_3$=t-$C_4H_9$): A suspension of 33 g. (0.1 mole) of 6-aminopenicillanic acid, pivaloyloxymethyl ester in a mixture of 250 ml. of isopropyl ether and 500 ml. of water and cooled in an ice bath is treated with a solution of 19.8 g. (0.1 mole) of phenylmalonic acid, mono acid chloride in isopropyl ether over a period of 15 minutes.

The pH of the reaction mixture is maintained at 5.5–6.5 by the simultaneous addition of a saturated solution of sodium bicarbonate. Following the addition, the reaction is stirred for 15 minutes at ice bath temperatures and then for 2 hours at room temperature. The organic layer is separated and the aqueous layer extracted several times with diethyl ether. The ether layers are combined with the isopropyl ether layer, dried and concentrated in vacuo to a white gum, 13.5 g. The pH of the aqueous layer is adjusted to pH 5.3 and repeatedly extracted with diethyl ether followed by drying and concentration to dryness, 18.6 g.

(c) Employing the procedure of Preparation A(a) and A(b), and starting with 6-aminopenicillanic acid and the requisite 1-alkanoyloxyalkyl halide, the following penicillin ester congeners are prepared:

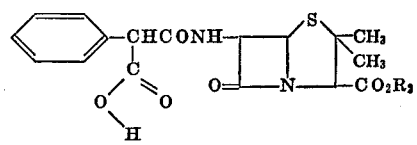

| $R_2$ | $R_2$ |
|---|---|
| $CH_3CO_2CH_2$— | $CH_3(CH_2)_2CO_2CH_2$— |
| $CH_3CO_2CH(CH_3)$— | $CH_3(CH_2)_2CO_2CH(C_2H_5)$— |
| $CH_3CO_2CH(C_2H_5)$— | $CH_3(CH_2)_3CO_2CH_2$— |
| $CH_3CO_2CH(C_3H_7)$— | $CH_3(CH_2)_3CO_2CH(C_3H_7)$— |
| $C_2H_5CO_2CH_2$— | $(CH_3)_3CCO_2CH(CH_3)$— |
| $C_2H_5CO_2CH(CH_3)$— | $(CH_3)_3CCO_2CH(C_2H_5)$— |
| $C_2H_5CO_2CH(C_3H_7)$— | $(CH_3)_2CHCO_2CH_2$— |
| $(CH_3)_2CHCO_2CH(CH_3)$— | $(CH_3)_2CHCH_2CO_2CH_2$— |

PREPARATION B

1-Alkanoyloxyalkyl Halides (a) Chloromethyl acetate: A mixture of 78.5 g. of acetyl chloride, 30 g. of dry paraformaldehyde and a minute amount of fused zinc chloride is heated on a water bath until a complete solution has been effected. The reaction mixture is then distilled in vacuo to provide the desired product, b.p. 113–115° C./748 mm.

(b) Employing the above procedure, which is that taught by Ulich, et al., J. Am. Chem. Soc., 43, 660 (1921), Euranto, et al., Acta. Chem. Scand., 20, 1273 (1966) and Rasmussen, et al., J. Am. Chem. Soc., 89, 5442 (1967), and starting with the known or commercially available aldehydes and acid halides, the following 1-alkanoyloxyalkyl halides are synthesized: α-chloroethyl acetate; α-bromopropyl acetate; α-chlorobutyl acetate; chloromethyl propionate; α-bromoethyl propionate; α-chlorobutyl propionate; chloromethyl isobutyrate; α-chloroethyl isobutyrate; bromomethyl butyrate; α-chloropropyl butyrate; bromomethyl valerate; α-chlorobutyl valerate; α-chloroethyl pivalate; chloromethyl pivalate; α-chloropropyl pivalate; and chloromethyl isovalerate.

PREPARATION C

Hydroxylamines (a) O-alkyl and O-cyanoalkyl hydroxylamines: The following hydroxylamine derivatives are synthesized by the method of Bruno, et. al., French Pat. 1,377,484 (C.A., 62, 7636 (1965), which comprises alkylation of N-hydroxyphthalimide followed by treatment of the intermediate with hydrazine; O-methyl hydroxylamine, O-ethyl hydroxylamine, O-n-butyl hydroxylamine, O-i-propyl hydroxylamine, 2-cyanoethyl hydroxylamine, 2-cyanopropyl hydroxylamine and 3-cyano-2-propyl hydroxylamine.

(b) O-carboxyalkyl hydroxylamines: Alkylation of acetoxime or benzohydroxamic acid with the appropriate haloalkanoic acid followed by acid hydrolysis, the method taught by Schumann, et. al, J. Med. Chem., 5, 464 (1962), provides the synthetic route to the O-carboxyalkyl hydroxylamines employed as intermediates leading to the compounds of the present invention. The following aminooxyalkanoic acids are prepared by this aforementioned procedure: $H_2NOCH_2CO_2H$, $H_2NOCH(CH_3)CO_2H$, $H_2NO(CH_2)_2CO_2H$, $H_2NOC(CH_3)_2CO_2H$ and $H_2NO(CH_2)_4CO_2H$.

(c) O-carbamylalkyl hydroxylamines: To 150 ml. of an acoholic ammonia solution is added 11.9 g. (0.1 mole) of methyl 2-aminooxypropionate, and the solution allowed to remain at room temperature in a sealed container for three days. The precipitated product is filtered from the chilled reaction mixture and recrystallized from isopropanol.

In a similar manner, which is the method as taught by Frank, et. al., Monatsh., 92, 725 (1961), the following O-carbamylalkyl hydroxylamines are synthesized:

$H_2NCO$—A—$ONH_2$

| A | A |
|---|---|
| —$CH_2$— | —$(CH_2)_2$— |
| —$C(CH_3)_2$— | —$(CH_2)_4$— |

(d) O-Haloalkyl hydroxylamines: The method of Bauer, et al., J. Org. Chem., 28, 1604 (1963) is employed for the preparation of the following O-haloalkyl hydroxylamine derivatives:

X—A—$ONH_2$

| X | A |
|---|---|
| Cl— | —CHCH$_2$— <br>     \|<br>    CH$_3$ |

| X | A |
|---|---|
| Cl | —$(CH_2)_2$— |
| Cl | —$(CH_2)_3$— |
| Cl | —CH$(CH_2)_2$— <br>    \|<br>    CH$_3$ |
| Br | —$(CH_2)_2$— |
| Br | —CHCH$_2$— <br>    \|<br>    CH$_3$ |
| Br | —CHCH$_2$— <br>    \|<br>    CH$_2$<br>    \|<br>    CH$_3$ |

(e) O-alkoxyalkyl and O-alkylthioalkyl hydroxylamines 2-methoxyethoxyamines: To 27.0 g. (0.1 mole) of 2-phthalimidooxyethyl bromide, prepared as an intermediate leading to the compounds of preparation C(d), in 200 ml. of dimethylformamide is added 5.9 g. (0.11 mole) of sodium methoxide. The reaction mixture is heated to 50° C. for 3 hours, after which the mixture is cooled, diluted with ice and water and the product extracted with methylene chloride. The organic layer, which contains the 2-methoxyphthalimidooxyethane, is separated, dried over sodium sulfate and concentrated to dryness in vacuo.

Without further purification, the residual product in 250 ml. of ethanol is treated with 100 ml. of one molar ethanol solution of hydrazine. The mixture is stirred under reflux for three hours and then evaporated to dryness. The residue is then treated with 200 ml. of 2 N hydrochloric acid at 50–55° C. for ten minutes followed by filtration. The filtrate is evaporated to dryness and the residual hydrochloride treated with a 20% sodium hydroxide solution and extracted with ethyl ether. Removal of the ether from the separated organic phase followed by distillation of the residue provides the desired 2-methoxyethoxyamine.

Starting with the requisite phthalimidooxyalkyl halide and sodium alkoxide or sodium alkanthiol, and following the above procedure, the following compounds are prepared:

Y—B—$ONH_2$

| Y | B |
|---|---|
| $C_2H_5O$ | —$(CH_2)_2$— |
| $i$-$C_3H_7O$ | —CH$(CH_2)_2$— <br>    \|<br>    CH$_3$ |
| $CH_3S$ | —$(CH_2)_2$— |
| $C_2H_5S$ | —$(CH_2)_3$— |
| $i$-$C_3H_7S$ | —CHCH$_2$— <br>    \|<br>    CH$_3$ |
| $n$-$C_4H_9S$ | —$(CH_2)_2$— |

PREPARATION D

Alkanoylisocyanates

Employing the methods taugh by Naitō, et. al., J. Antibiot., (Tokyo), Ser. A, 18, 145 (1965), and starting with the appropriate reagents, the following alkanoyl isocyanates are synthesized:

$$R_1-\overset{O}{\underset{\|}{C}}NCO$$

| $R_1$ | $R_1$ |
|---|---|
| $C_2H_5$ | $BrCH_2$— |
| $n$-$C_3H_7$— | $BrCH(CH_3)$— |
| $i$-$C_3H_7$— | $BrCH(CH_3)CH_2$— |
| $n$-$C_4H_9$— | $Br(CH_2)_4$— |
| $(CH_3)_2CHCH_2$— | $CH_3OCH_2$— |
| $ClCH_2$— | $i$-$C_3H_7OCH(CH_3)$— |

| $R_1$ | $R_1$ |
|---|---|
| $Cl(CH_2)_2$— | $n$-$C_4H_9O(CH_2)_4$— |
| $ClCH(CH_3)$— | $C_2H_5SCH(CH_3)$— |
| $Cl(CH_2)_4$— | $i$-$C_3H_7SCH_2$— |
| $n$-$C_3H_7SCH_2$— | $s$-$C_4H_9S(CH_2)_4$— |
| $NCCH_2$— | $H_2NCOCH_2$— |
| $NC(CH_2)_2$— | $H_2NCO(CH_2)_2$— |
| $NCCH(CH_3)$— | $H_2NCOCH_2CH(CH_3)CH_2$— |
| $NC(CH_2)_4$— | $C_6H_5CH_2OCOCH_2$— |
| $C_6H_5CH_2OCOCH(CH_3)$— | $C_6H_5CH_2OCO(CH_2)_2$— |
| $C_6H_5CH_2OCO(CH_2)_4$— | $C_6H_5CH_2OCOCH(CH_3)CH_2$— |

PREPARATION E (a) The following sulfonyl isocyanates are synthesized by the reaction of the corresponding sulfonic acid anhydride with silver isocyanate, the method as taught by Field, et. al., J. Am. Chem. Soc., 76, 1222 (1954), while the appropriate anhydrides are prepared from the sulfonic acid and a carbodiimide according to the procedure of Khorana, Canad. J. Chem., 31, 585 (1953):

$R_1SO_2NCO$

| $R_1$ | $R_1$ |
|---|---|
| $CH_3$— | |
| $n$-$C_4H_9$— | $n$-$C_3H_7SCH(CH_3)$— |
| $C_2H_5OCH_2$— | $n$-$C_4H_9SCH_2$— |
| $n$-$C_3H_7OCH(CH_3)$— | $s$-$C_4H_9S(CH_2)_4$— |
| $i$-$C_3H_7O(CH_2)_3$— | $NCCH_2$— |
| $CH_3SCH_2$— | $NC(CH_2)_3$— |
| $H_2NCOCH(CH_3)$— | $NC(CH_2)_4$— |
| $C_6H_5CH_2OCOCH_2$— | $H_2NCOCH_2$— |
| $C_6H_5CH_2OCOCH(CH_3)CH_2$— | $H_2NCO(CH_2)_3$— |
| $C_6H_5CH_2OCOCH(CH_3)CH_2$— | $C_6H_5CH_2OCO(CH_2)_3$— |
| $C_6H_5CH_2OCOCH(C_2H_5)CH_2$— | $C_6H_5CH_2OCO(CH_2)_4$— |

(b) Repeating the procedure of Belgian Pat. 660,782, the following haloalkylsulfonyl isocyanates are prepared: 2-chloroethylsulfonyl isocyanate, 4-chlorobutylsulfonyl isocyanate, 2-bromethylsulfonyl isocyanate and 4-bromobutylsulfonyl isocyanate.

What is claimed is:
1. A compound selected from the group consisting of penicillins having the formula:

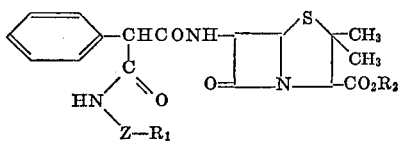

wherein
  $R_1$ is selected from the group consisting of alkyl containing from 1 to 4 carbon atoms and substituted alkyl wherein said alkyl contains from 1 to 4 carbon atoms and said substituent is selected from the group consisting of carboxy, carbamyl, cyano, chlorine, bromine and alkoxy and alkylthio each containing from 1 to 3 carbon atoms;
  Z is selected from the group consisting of —O—,

and —$SO_2$—;
  $R_2$ is selected from the group consisting of 1-alkanoyloxyalkyl wherein said alkanoyl group contains from 2 to 5 carbon atoms and said alkyl contains from 1 to 4 carbon atoms and hydrogen; and
the pharmaceutically acceptable basic salts thereof, wherein said penicillin is an acid.

2. A compound of claim 1 wherein Z is —O— and $R_2$ is 1-alkanoyloxyalkyl wherein said alkanoyl group contains from 2 to 5 carbon atoms and said alkyl contains from 1 to 4 carbon atoms.

3. The compound of claim 2 wherein $R_1$ is

and $R_2$ is $(CH_3)_3CCO_2CH_2$—.

4. The compound of claim 2 wherein $R_1$ is $H_2NCOCH_2$— and $R_2$ is $(CH_3)_2CCO_2CH_2$—.

5. A compound of claim 1 wherein Z is

and $R_2$ is 1-alkanoyloxyalkyl wherein said alkanoyl group contains from 2 to 5 carbon atoms and said alkyl contains from 1 to 4 carbon atoms.

6. The compound of claim 5 wherein $R_1$ is

and $R_2$ is $(CH_3)_3CCO_2CH_2$—.

7. The compound of claim 5 wherein $R_1$ is $CH_2$— and $R_2$ is $(CH_3)_3CCO_2CH_2$—.

8. A compound of claim 1 wherein Z is —$SO_2$— and $R_2$ is 1-alkanoyloxyalkyl wherein said alkanoyl group contains from 2 to 5 carbon atoms and said alkyl contains from 1 to 4 carbon atoms.

9. The compound of claim 8 wherein $R_1$ is $CH_3$— and $R_2$ is $(CH_3)_3CCO_2CH_2$—.

10. The compound of claim 8 wherein $R_1$ is

and $R_2$ is $(CH_3)_3CCO_2CH_2$—.

11. A compound of the formula:

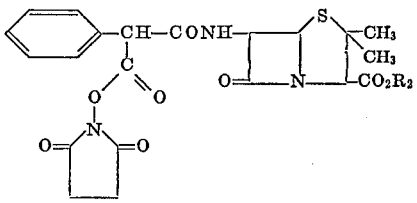

wherein
  $R_2$ is 1-alkanoyloxyalkyl wherein said alkanoyl group contains from 2 to 5 carbon atoms and said alkyl contains from 1 to 4 carbon atoms.

12. The compound of claim 11 wherein $R_2$ is $(CH_3)_3CCO_2CH_2$—.

References Cited
UNITED STATES PATENTS

| | | | |
|---|---|---|---|
| 3,574,189 | 4/1971 | Butler | 260—239.1 |
| 3,631,056 | 12/1971 | Butler | 260—239.1 |
| 3,577,408 | 5/1971 | Alburn et al. | 260—239.1 |
| 3,647,783 | 3/1972 | Pirie | 260—239.1 |

NICHOLAS S. RIZZO, Primary Examiner

U.S. Cl. X.R.
424—271